United States Patent [19]
Butterfield

[11] 3,729,018
[45] Apr. 24, 1973

[54] UNLOADER VALVE FOR SPRAY GUNS

[75] Inventor: Ted Lee Butterfield, Naperville, Ill.

[73] Assignee: Spraying Systems, Co., Wheaton, Ill.

[22] Filed: July 6, 1971

[21] Appl. No.: 160,014

Related U.S. Application Data

[63] Continuation-in-part of Ser. No. 55,319, July 6, 1970, abandoned, which is a continuation of Ser. No. 797,196, Feb. 6, 1969, abandoned.

[52] U.S. Cl. ............... 137/469, 137/501, 137/614.2, 251/121
[51] Int. Cl. ............................................. F16k 17/20
[58] Field of Search .................. 137/501, 475, 478, 137/614.2, 499, 501, 614.2, 469; 437/469, 614.17, 493; 251/120, 117, 121, 122

[56] References Cited

UNITED STATES PATENTS

| | | | |
|---|---|---|---|
| 1,898,226 | 2/1933 | Taylor | 137/614.2 |
| 2,686,534 | 8/1954 | Montelius | 251/121 X |
| 197,072 | 11/1877 | Ashton et al. | 137/614.2 |
| 1,707,250 | 4/1929 | Bush | 137/469 X |
| 2,874,718 | 2/1959 | Kelly | 137/469 |
| 2,807,144 | 9/1957 | St. Clair | 137/501 X |

Primary Examiner—Henry T. Klinksiek
Assistant Examiner—Robert J. Miller
Attorney—Robert C. Brown, Jr. et al.

[57] ABSTRACT

An unloader type valve for spray guns supplied from pumps to limit operating pressures of the pump when the spray gun is stopped. The valve utilizes an adjustable spring to select pressure forces for opening the valve and a variable flow passage from the valve to an outlet when the valve is open, the allowing matching of the valve to the precise operating pressures and flow rates in spray gun and pumping system installations.

9 Claims, 3 Drawing Figures

Patented April 24, 1973 3,729,018

Inventor
Ted L. Butterfield
By Mann, Brown, McWilliams
and Bradway    Attys.

Patented April 24, 1973

Inventor
Ted L. Butterfield
By Mann, Brown, McWilliams
and Bradway
Attys.

UNLOADER VALVE FOR SPRAY GUNS

This application is a continuation-in-part of my copending application filed July 6, 1970, under Ser. No. 55,319, now abandoned, which in turn is a continuation of my earlier application Ser. No. 797,196, filed Feb. 6, 1969, now abandoned.

This application is directed to improvements in bypass or relief valves of the type used with pump supplied spray guns.

Pump supplied spray guns of the type found in agricultural and industrial applications include some provision for preventing excessive build-up of pressure on the pump when the spray gun is stopped. Usually it is not desirable to stop the pump at the time the spray gun is stopped. Unless some provision is made for relieving the pressure, the pressure can increase to a level where the pump motor, pump and/or motor bearings may be overloaded and seriously damaged or ultimately destroyed, particularly in positive displacement pumps. Even centrifugal pumps or the drive therefor may be damaged from an overloaded condition due to an increase in pressure.

In the past, spring biased pressure relief valves have been used to limit the pressure rise when spraying has stopped. These open at a pressure somewhat above the normal spraying pressure and hence the pressure and work of the pump are increased when the gun is idle. Other types of valves such as unloaders use a bypass line and spring biased valve system which opens the bypass when the pressure increases at the time that the spray gun is stopped. The valve arrangement is such as to reduce the pumping system pressure well below the spraying pressure, once the spray gun is stopped and the valve for the bypass is open.

The spring biased pressure relief valves are not desirable where the spraying pressure is very close to the maximum rated pressure for the pumping system and because of unnecessary wear of the pumping system. Also, as pointed out in my earlier applications, the opening and closing of the piston in the unloader type of valve is dependent upon the relationships in flow area through the valve as well as operating pressures and flow rates. These operating pressures and flow rates may vary from one installation to the next and may vary in the same installation from time to time due to wear or changes desired by the operator. Hence, the unloader valve has heretofore been designed for specific conditions of operating pressures and flow rates. When so designed, the unloader valve is not easily adaptable to other pressure and flow rate conditions and does not accommodate changing conditions.

My earlier applications were directed to unloader valves specifically designed to provide a variable orifice for the flow passage through the valve to thereby vary the flow rate through the valve. The valves were designed so that the same basic unloader valve assembly could be utilized with a variety of variable orifices, preferably in the form of removable orifice plates so that the exact flow area required for proper operation of the valve with any particular pumping system and spray gun could be accommodated. The arrangement, however, was not easily adjustable when the same pumping system is used with a different operating pressure.

With the foregoing in mind, the major purposes of the present invention are to provide a spring biased type unloader valve which quickly reduces operating pressures on the pumping system when a spray gun is stopped; to provide such a valve wherein the pressure necessary to open the valve may be quickly and easily adjusted over a wide range; to provide such a valve with variable flow facilities so that the flow rate through the valve may be varied over a relatively wide range while, when combined with the variable pressure feature of the valve, permits an extremely wide range of operating pressures and flow rates and a highly versatile accommodation of different operating conditions; to provide such a valve with built-in safety features which prevent adjustment of the valve to a point where the pumping system could be damaged; to arrange such a valve so that it can easily be adjusted in the field by an operator so as to properly match the exact operating conditions of the particular spray gun and pumping system with which the valve is associated; and to arrange such a valve for simple manufacturing techniques.

These and other purposes will appear from time to time in the course of the ensuing specification and claims, when taken in connection with the accompanying drawings, in which:

Like elements are designated by like characters throughout the specification and drawings.

Figure 1:
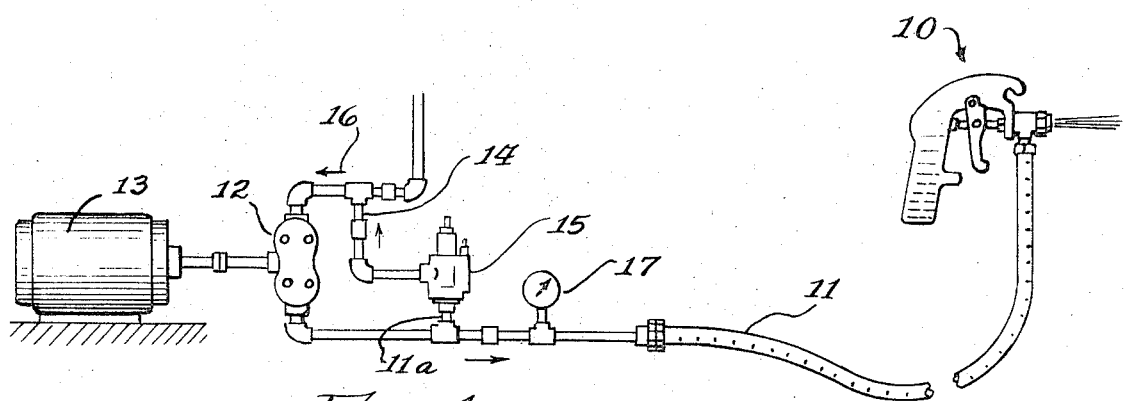
FIG. 1 is a diagrammatic view of a typical spray gun and pumping system therefor and with a valve incorporating the principles of the present invention connected with the system and gun.

With specific reference now to the drawings, and in the first instance to FIG. 1, the numeral 10 generally designates a hand manipulated spray gun of the type utilizing a trigger or lever to open an outlet from the gun to direct a spray therefrom. A fluid supply line 11 is connected to the gun and supplies fluid thereto from a pump 12 which is illustrated as a positive displacement type of pump. A motor 13 drives the pump. Spraying assemblies of this type in the past have included unloader valves in a bypass line from the fluid supply line 11 to the inlet of the valve. Such a bypass line is designated at 14 with the unloader valve 15 of the present invention connected in the bypass line. The inlet of the valve is connected by a line 11a to supply line 11. The bypass line 14 is connected to the inlet line 16 for the pump. Inlet 16 is also connected to a suitable fluid source (not shown).

In systems of this type, a pressure gauge 17 may be included in the fluid supply line 11. Other optional facilities may be included in the same line.

The unloader valve in systems of this general type are intended to close under normal spraying conditions when the spray gun 10 is open and delivering fluid therefrom. When the spray gun 10 is closed, the pump 12 increases the pressure in the line 11 immediately and this immediately opens the unloader valve to divert fluid back to inlet of the pump to prevent a pressure build-up.

Figure 2:
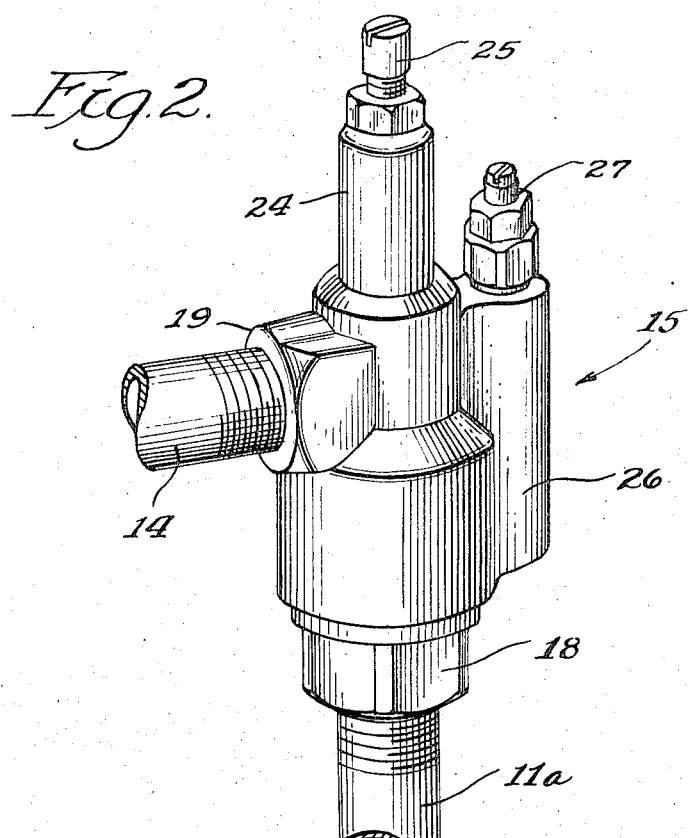
FIG. 2 is a perspective view of the unloader valve illustrated in FIG. 1.
Figure 3:
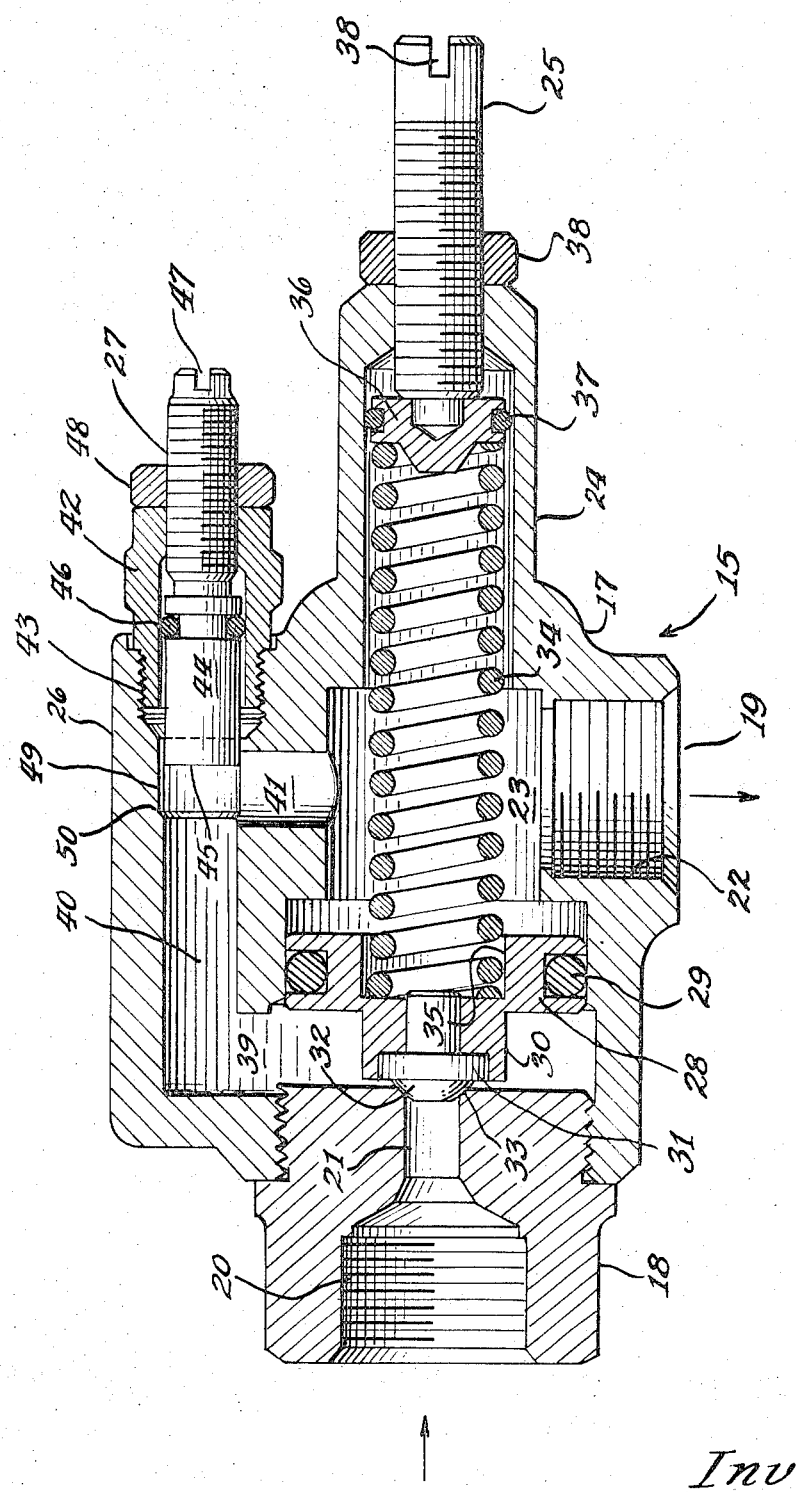
FIG. 3 is a cross-sectional view of the valve illustrated in FIGS. 1 and 2.

The unloader valve of the present invention, as is seen in FIGS. 2 and 3, is defined by a hollow valve body 17 having an outlet fitting 18 threaded in an end bore of the body and an outlet fitting 19. Inlet fitting 18 may be formed as an exteriorly threaded plug having an internally threaded passage 20 communicating with an interior passage 21 of reduced diameter. The inlet fitting may of course be provided with exterior threads to receive a suitable hose coupling instead of the interior threads shown. A variety of sizes and styles of inlet fittings may be provided for the present valve to enable adaptation of the valve to existing conduits of different styles and sizes. Outlet fitting 19 is defined by a threaded bore 22. The bore 22 extends at right angles to the axis of the inlet fitting and communicates with an interior operating chamber or space 23 in the valve body.

The valve body is formed with a tubular extension 24 axially aligned with and opposite to the inlet fitting 18. The extension 24 carries an adjusting screw 25 for varying the operating pressure of the valve in a manner which will be described. The valve body also includes a tubular portion 26 on the side thereof opposite to the outlet 19. The tubular portion 26 carries an adjusting screw 27 for adjusting the flow rate through the valve in a manner which will be described.

The operating chamber 23 of the valve has a piston 28 slidably mounted in an enlarged portion of the chamber. The peripheral wall of the piston has a groove in which an O-ring 29 is mounted for sealing the piston to the chamber wall. Piston 28 has a portion of reduced diameter 30 facing the inlet 21. The overall piston cross-sectional area is considerably greater than the cross-sectional area of the inlet passage 21. Reduced portion 30 of the piston carries a long wearing insert 31 of Teflon or equivalent material and this insert includes a projection 32 which is adapted to seat against a valve seat 33 formed around the inlet passage 21 at the inner side thereof to close off flow through the inlet passage 21 and to the interior space of the valve. A coil spring 34 biases the piston 30 to the closed position illustrated in FIG. 3.

In valves of this general type the piston will move to the right (as seen in FIG. 3), when the force of the pressure in the inlet passage 21 rises to a point exceeding the force of the spring 34. When the piston moves to the right and thus opens the valve to receive flow from inlet 21, the pressure required to hold the piston in the open position is much less than the pressure required to open the piston due to the fact that, when the piston is open, the entire piston cross-sectional area is subjected to pressure.

Spring 34 has one end thereof seated in a recess 35 in the piston and the other end thereof carried by a spring retainer 36 which is carried on the end of the adjusting screw 25. The spring retainer 36 has a groove in the peripheral wall thereof. An O-ring 37 is seated in this groove to seal the bore of the tubular extension 24 against leakage. The exterior end of the screw 25 is slotted as at 38 to receive a screw driver or equivalent adjusting tool. By rotating the screw, the spring retainer 36 is moved inwardly and outwardly within the tubular extension to thereby adjust the force developed by the spring 34 against the piston. A lock nut 38 is carried by the screw 25 and is adapted to bear against the end of the tubular extension 24 to thereby lock the adjusting screw 25 in a selected axial position.

The end of the operating chamber 23 adjacent to the inlet passage communicates with a bypass passage formed through the tubular portion 26. The bypass passage is defined by a first bore 39 extending at right angles to the valve body and opening into the chamber 23. Bore 39 communicates with a passage formed as bore 40 extending at right angles to the bore 39 and formed through the tubular portion 26. Bore 40 communicates with another bore 41 which is formed coaxially with the outlet 19 and which opens into the operating chamber 23 on the side of the piston opposite to the inlet side. The cross-sectional flow area of the passage means defined by the bores 39, 40 and 41 should be at least as great and preferably greater than the flow area of the inlet passage 21.

Adjusting screw 27 is threadably received in a plug 42 which is threaded into an enlarged bore portion 43 in tubular portion 26. Bore 43 is coaxial with bore 40. Screw 27 has a cylindrical extension 44 with a flat end face 45. The extension 44 is sealed to the wall of an interior bore in plug 42 by means of an O-ring 46 carried in a peripheral groove in the extension.

Screw 27 has a slotted exterior end as at 47 for receiving a screw driver or similar adjusting tool. A lock nut 48 is carried by the screw and is adapted to abut against the exterior end of plug 42 to fix the screw in a selected axial position. The end face 45 of the cylindrical portion 44 may be moved inwardly and outwardly over the bore 41 to thus selectively vary the flow area through the bore 41 and thus vary flow rate through the valve.

It is preferred to form the cylindrical portion 44 on a diameter slightly larger than the diameter of bore 40 while having the enlarged bore portion 43 overlying the bore passage 41. This enlargement commences at a shoulder 50 spaced within the outline of bore 41. The cylindrical portion 44 may thus abut against this shoulder, whereupon the inward adjustment of the cylindrical portion 44 is limited to a position allowing some flow through the valve. This prevents some accidental positioning of the cylindrical portion 44 which would close off the bore 41 completely and thus present dangerous pressure conditions in the pumping system. The cylindrical portion is movable to the right (FIG. 3) to a position fully opening bore 41.

In operation, and with the valve as disclosed in FIGS. 2 and 3 installed in a pump supplied spray gun assembly as illustrated in FIG. 1, the adjusting screw 25 is moved to a position where the spring force exerted on the piston is relatively light. The flow rate adjusting screw 27 is rotated until the cylindrical portion 44 moves to its dead end position within the plug 42, thus fully opening the bypass passage. The pumping system is then started and the spray gun opened. Adjusting screw 25 is then rotated until the force developed by spring 34 is sufficient to close the piston insert 31 against the seat 33. The screw 25 is preferably turned slightly more (as for example one-fourth or one-half turn) than that just necessary to close the valve. The spray gun is then turned off. With the bypass passage in a maximum flow rate condition, flow through the bypass passage will be sufficiently rapid to cause a large pressure drop and this will cause the piston to close, whereupon pressure builds up and the piston will open. This "open and closed" condition will be repeated in a cyclic manner.

The flow rate adjusting screw 27 is then rotated to move the cylindrical portion inwardly to gradually restrict flow. This inward movement of the cylindrical portion 44 is continued until the cyclic reciprocation of the piston stops. The screw 27 is then rotated an additional small amount such as one-quarter turn, whereupon the lock nut is rotated to fix the screw in the adjusted position. The setting is then checked by opening and closing the spray gun several times. If the piston should cycle between open and closed positions when the spray gun is opened, the adjusting screw 25 is then rotated inwardly to create additional closing forces by the spring 34 until the cycling stops. If the piston should continue to cycle when the spray gun is closed, the flow rate adjusting screw 27 is then rotated to further restrict flow.

In the event that no cycling of the piston occurs when the spray gun is open but that the piston fails to close, unscrewing the adjusting screw 27 to increase the flow through the bypass passage will relieve the pressure conditions against the piston sufficiently to allow the spring 34 to close the piston.

As may be noted in the foregoing, the valve is easily set up to match exact operating conditions encountered in any spray gun and pump assembly. It is adjusted in the field for proper conditions of use. As these conditions change, due to wear or because of a man-made change in conditions or any other cause, the adjustments will enable proper use of the valve.

I claim:

1. An unloader valve defined by a hollow valve body having an inlet and an outlet leading to an interior working space in the body, a pressure operated piston movably mounted in the interior space of said body, said valve body having a valve seat of smaller cross-sectional area than said piston and formed around said inlet passage, said piston including a reduced portion adapted to engage said seat to close off flow through said body, said valve body including passage means communicating the space between said seat and said piston, when said piston is away from said seat, with an outlet from said body, adjustable means for varying the flow area through said passage means, a spring positioned between said piston and an abutment in said valve body to exert closing forces on said piston, and means for adjusting the spring pressure to adjust the closing forces exerted by said spring on said piston to thereby vary the pressure force in said inlet passage necessary to move said piston away from said seat, the entire cross-sectional area of said piston being subjected to the pressure in said space when said piston is away from said seat to thereby hold the piston away from said seat as long as the total force due to pressure in said space exceeds the closing forces of said spring.

2. The structure of claim 1 wherein said passage means is defined by a passage positioned laterally of said interior space and communicating with said space on opposite sides of said piston.

3. The structure of claim 2 wherein said adjustable means for regulating flow is defined by a flow restricting element, and said element is variably positionable across a portion of said passage means by an adjusting screw carried by said body.

4. The structure of claim 3 wherein said element is variably positionable across a portion of said passage extending transversely to the axis of said piston and said passage has a shoulder positioned over said portion and limiting movement of said element over said portion to a position providing a small flow space through said portion.

5. The structure of claim 1 wherein said means for adjusting spring pressure includes a movable abutment engaging one end of said spring, said abutment being axially movable against said spring by a screw threaded in said body.

6. The structure of claim 5 wherein said passage means is defined by a passage in said body and positioned laterally of said interior space, said outlet being defined by a bore opening into said space on the side of said piston opposite to the inlet side, said passage communicating with said space by a first bore positioned transversely of said passage and opening into said working space on the inlet side of said piston and a second bore coaxial with said outlet bore and extending transversely of said passage.

7. The structure of claim 6 wherein said adjustable means for varying the flow area is defined by an element positioned for movement axially of said passage and movable across said second bore to restrict flow therethrough, said valve including means for moving said element and stop means for limiting movement across said second bore to a position leaving a small flow space through said second bore.

8. The structure of claim 7 wherein said stop means is defined by a shoulder in said passage.

9. The structure of claim 7 wherein said means for moving said element is defined by a screw threaded in said body and carrying said element.

* * * * *